Feb. 17, 1948.　　　H. M. DRESSEL　　　2,436,208
CONDENSER
Filed July 3, 1943

WITNESSES.
E. J. Maloney.
E. O. Johns

INVENTOR.
Henry M. Dressel
BY Brown, Critchlow & Flick
his ATTORNEYS.

Patented Feb. 17, 1948

2,436,208

UNITED STATES PATENT OFFICE 2,436,208

CONDENSER

Henry M. Dressel, St. Marys, Pa., assignor to Stackpole Carbon Company, St. Marys, Pa., a corporation of Pennsylvania Application July 3, 1943, Serial No. 493,327

2 Claims. (Cl. 175—41)

This invention relates to electrical condensers, and more particularly to high capacity fixed condensers for use in radios.

For radio use it is very desirable to have electrical condensers of as high capacity as possible and yet which are as small as possible. Heretofore, high capacity condensers have in general been relatively large and comparatively expensive to make, while the smaller ones have necessarily possessed lower capacity.

It is among the objects of this invention to provide an electrical condenser which has very high capacity, which is of extremely small size, which is simple and inexpensive to make, and which is strong and durable.

In accordance with this invention, the metal condenser surfaces preferably are integral with the terminal wires and are separated by a film or thin layer of material having a high dielectric constant. This dielectric is a refractory material in powder form preferably mixed with as small an amount as possible of a binding material, which has a low power factor. The most suitable dielectric consists essentially of rutile powder, or powdered titania glasses, that is compressed between the condenser surfaces to give it a high density. In one form of the invention the metal condenser surfaces are held in fixed relation to each other by a hardened molded plastic, while in another form such a molded plastic or a preformed plastic ceramic member may cooperate with one of the metal parts for the same purpose.

Figure 1:
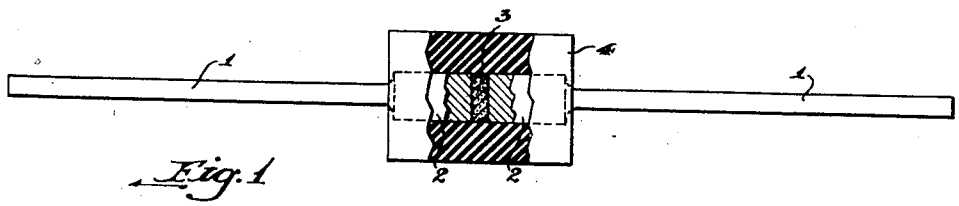
Figure 2:
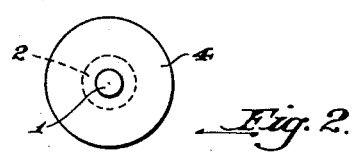
Figure 3:
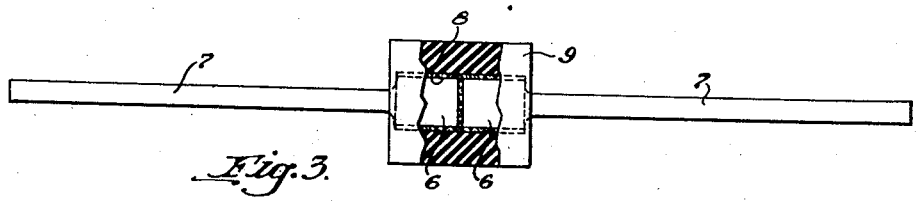
Figure 4:
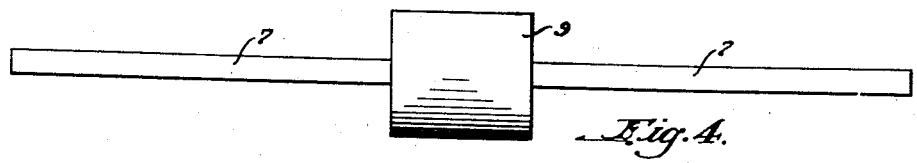
Figure 6:
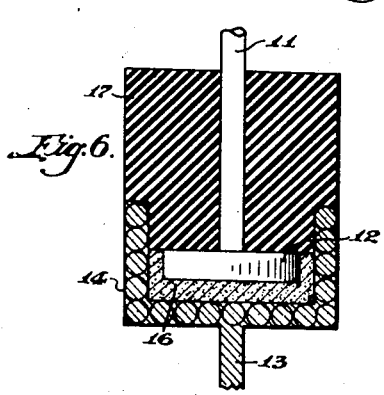
Figure 7:
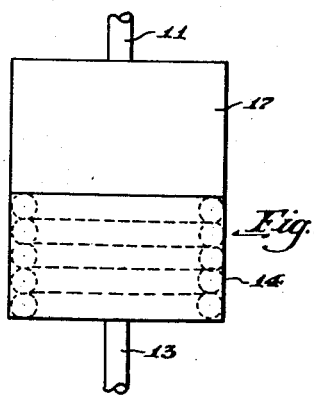
Figure 5:
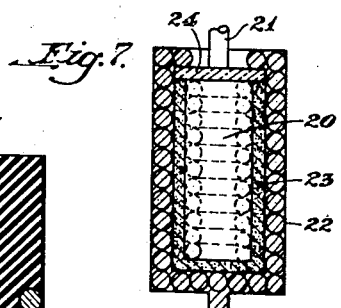
Figure 8:
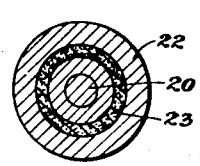

The invention is illustrated in the accompanying drawings in which Fig. 1 is a side view, partly broken away of one form of my condenser; Fig. 2 is an end view thereof; Fig. 3 is a view similar to Fig. 1 of a modification; Fig. 4 is a side view of the condenser of Fig. 3; Figs. 5 and 6 are a side view and a longitudinal section through another modification; and Figs. 7 and 8 are longitudinal and transverse sections through a still further embodiment.

Referring to Figs. 1 and 2 of the drawings, a pair of electrodes or terminal wires 1 are upset at one end to form integral heads 2. The two heads are placed adjacent each other in axial alignment with a very small space between their end surfaces which serve as metal condenser surfaces. In order to raise the capacity of the condenser, the small space between heads 2 is filled with a powdered dielectric 3 consisting chiefly or entirely of a refractory material having a very high dielectric constant, such as 10 or above. In accordance with this invention this material is powdered titania glasses or titanium dioxide in the form known as rutile. The rutile powder, for example, may be mixed with a small amount of wax to hold it together while it is being applied. Or, a very small amount of a thermo-setting binder, not more than 5%, may be used for this purpose, in which case the binder likewise should have as high a dielectric constant as possible in order that the losses resulting from its use will not be any more than absolutely necessary. Such a binder may be Bakelite or polystyrene.

The metal heads and the intervening dielectric 3 are held securely in their proper relation to one another by means of a cylindrical body 4 of a thermo-setting plastic, such as Bakelite, that entirely surrounds them. This body also serves to protect the enclosed elements and to insulate them. In order to make the most effective use of the dielectric powder, it should be highly compacted to give it a high density. Therefore, the entire unit is pressed under considerable pressure, 500 pounds for example. If pressed cold, it then is baked for about twenty minutes between 450° and 500° F. to cure the Bakelite. If pressed hot, it is cured in the mold by keeping it there one or two minutes. Or, dielectric 3 may be preformed under pressure as a tiny slug and then inserted between heads 2, but such a procedure introduces a difficult handling problem. To prevent the unit from sticking in the dies, about 1% of lubricant may be mixed with the Bakelite, while the addition of about 2% of a plasticizing agent will make the material flow readily when cold molded and will add strength to it for handling before baking. If a cold molded unit is baked at 80° C. for about twenty-four hours and then four or five days at 120° C., the power factor will be improved and greater stability of capacity will be obtained for changes in temperature. The baking at 80° C. is unnecessary for hot molded units, it being sufficient to bake at 120° C. for from six to twelve hours. The compressed rutile has an effective dielectric constant of from about 40 to 80. If a compacted powdered titania glass is used in place of rutile, the dielectric constant is much higher, extending up into the thousands.

By following this invention and making condensers $\frac{3}{32}$ inch long by $\frac{1}{8}$ inch in diameter, provided with metal condenser surfaces .06 inch in diameter spaced .015 inch apart by compressed rutile, the condensers will have a capacity as high as six micro-microfarads. This is an extremely high capacity, especially for such a tiny condenser. It also will be noted that the condenser is very simple and inexpensive to make and requires but very little metal. The terminal wires 1 being integral with heads 2, there is no problem of providing a good mechanical and electrical connection between them, which would be especially hard to do with such small elements. There likewise is no difficulty in binding the various elements of the condenser together as there is when a ceramic binder is used which must be prefired at a very high temperature and then cooled before the electrodes can be attached.

In the modification shown in Figs. 3 and 4, the metal heads 6 on the terminal wires 7 are first coated with a dielectric film 8 and are then placed end to end with only the film separating them. They are held in this position as described above by means of a body 9 of Bakelite or the like which is compressed around them and baked. Also, as in the first embodiment, the dielectric is principally a powdered refractory material having a high dielectric constant, such as rutile, but it may be mixed with a small amount of wax or polystyrene so that it can be applied as a film coating.

An especially durable condenser made in accordance with the principles of my invention is shown in Figs. 5 and 6. In this case one of the wire leads 11 is provided with a disc-like head 12 that may be formed by winding the end of the wire spirally upon itself and then dipping in solder to make it smooth and solid. The other lead 13 is provided with a head in the form of a metal cup 14 on one end that likewise may be formed by winding the end portion of the wire on itself and then dipping in solder to hold the convolutions together and to fill in the grooves between them. A layer 16 of powdered rutile or titania glass is placed in the bottom of the cup and the head 12 is inserted in the cup with its lower surface against the powder. The head is smaller than the cup and is centered therein so that it does not touch the cup at any point. A cold molded slug or plug 17 of a thermo-setting material, such as Bakelite, and having an axial passage through it is slipped over wire 11. The diameter of this plug is small enough to allow its inner or lower end to be inserted in the cup and to engage the upper surface of head 12. In practice, wire 11 may be inserted in plug 17 before head 12 is inserted in the cup. The plug centers the head in the cup. Pressure is then applied axially of the unit to cause the plug to press the head tightly against the rutile which will be squeezed up around the sides of the head in the space between the head and cup. The pressure also compresses the plug axially and expands it radially to the diameter of the outside of the cup whereby the finished unit is of substantially uniform diameter from end to end. The unit is then baked as disclosed above to cure the Bakelite and to make the unit strong and durable. An advantage of this type of unit is that the Bakelite is not in the dielectric field and therefore does not limit the usefulness of the condenser by causing electrical losses.

A slightly different condenser is shown in Figs. 7 and 8 wherein the head 20 is made in the form of an elongated solid metal cylinder, preferably by winding an integral extension of terminal 21 spirally and then dipping it in solder and compressing it. The head or cup 22 may be formed in the same way as cup 14 of Figs. 5 and 6, but of course it is made longer in order to house the cylindrical head 20. A layer 23 of powdered refractory dielectric material having a high dielectric constant is compressed between the cup and head 20 as in the preceding embodiment. Although the cup and head may be held together, and the unit sealed, by a plug of thermosetting material, another way of doing this is illustrated. Thus, a preformed and prefired ceramic washer 24 is slipped over terminal 21 and rests on top of head 20. The top of the cup is spun or bent inwardly to hold the washer in place and to thereby lock the various parts together. The capacity of this type of condenser can readily be changed by changing the length of the head and cup.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A high capacity electrical condenser comprising a pair of flexible wires each provided at one end with a substantially cylindrical solid head integral therewith, said heads being approximately .06 inch in diameter and having opposed flat end surfaces substantially parallel to each other about .015 inch apart, a thin dielectric layer between said heads, and a highly compressed hardened plastic body enclosing said heads and dielectric layer in contact therewith and holding them in fixed relation to one another, said body having a length and diameter each substantially no greater than $\frac{3}{32}$ inch.

2. An electrical condenser of extremely small size comprising a pair of flexible wires each provided at one end with a substantially cylindrical solid head integral therewith, said heads being substantially the same size and disposed in axial alignment, the opposed end surfaces of the adjacent heads being substantially flat and parallel with a slight space between them, dielectric material filling said space, and a hardened plastic body enclosing said heads and dielectric material in contact therewith and holding them in fixed relation to one another.

HENRY M. DRESSEL.

REFERENCES CITED

The following references are of record in the file of this patent:

UNITED STATES PATENTS

| Number | Name | Date |
|---|---|---|
| 1,174,600 | Murdock | Mar. 7, 1916 |
| 2,072,850 | Andre | Mar. 9, 1937 |
| 2,119,744 | Heyman | June 7, 1938 |
| 2,137,135 | Fuwa | Nov. 15, 1938 |
| 2,148,607 | De Lange | Feb. 28, 1939 |
| 2,159,793 | Grundmann | May 23, 1939 |
| 2,270,872 | Goede | Jan. 27, 1942 |
| 2,330,950 | Bugel | Oct. 5, 1943 |

FOREIGN PATENTS

| Number | Country | Date |
|---|---|---|
| 156,768 | Austria | 1939 |
| 445,495 | Great Britain | 1936 |
| 470,897 | Great Britain | 1937 |
| 493,001 | Germany | 1930 |